United States Patent
Kumar

(10) Patent No.: US 11,899,539 B2
(45) Date of Patent: Feb. 13, 2024

(54) SYNCHRONIZED GENERATION OF BACKUP COPY FOR FEDERATED APPLICATION IN AN INFORMATION PROCESSING SYSTEM

(71) Applicant: EMC IP Holding Company LLC, Hopkinton, MA (US)

(72) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 17/073,954

(22) Filed: Oct. 19, 2020

(65) Prior Publication Data
US 2022/0121526 A1 Apr. 21, 2022

(51) Int. Cl.
*G06F 11/14* (2006.01)
*G06F 9/48* (2006.01)

(52) U.S. Cl.
CPC .......... *G06F 11/1451* (2013.01); *G06F 9/485* (2013.01); *G06F 11/1464* (2013.01); *G06F 11/1466* (2013.01); *G06F 2201/84* (2013.01)

(58) Field of Classification Search
CPC .. G06F 11/1451; G06F 9/485; G06F 11/1464; G06F 11/1466; G06F 2201/84
USPC ........................................................ 711/162
See application file for complete search history.

(56) References Cited

U.S. PATENT DOCUMENTS

| | | | | |
|---|---|---|---|---|
| 6,988,262 B1* | 1/2006 | Mallory | .................. | G06F 9/547 |
| | | | | 714/E11.21 |
| 7,549,027 B1* | 6/2009 | McAndrews | ....... | G06F 11/1469 |
| | | | | 711/161 |
| 10,162,709 B1* | 12/2018 | Lazier | ................. | G06F 11/1451 |
| 10,474,367 B1* | 11/2019 | Mallick | .................. | G06F 3/065 |
| 2006/0129608 A1* | 6/2006 | Sato | ..................... | G06F 11/1461 |
| | | | | 714/E11.12 |
| 2007/0214196 A1* | 9/2007 | Garimella | ........... | G06F 11/1464 |
| 2008/0228833 A1* | 9/2008 | Kano | .................. | G06F 11/1469 |
| 2008/0320219 A1* | 12/2008 | Okada | ................. | G06F 11/2064 |
| | | | | 711/E12.001 |
| 2010/0198949 A1* | 8/2010 | Elrom | .................... | G06F 16/273 |
| | | | | 709/222 |
| 2013/0097397 A1* | 4/2013 | Sundrani | ............. | G06F 11/1456 |
| | | | | 711/E12.103 |

(Continued)

OTHER PUBLICATIONS

Wikipedia, "Shadow Copy," https://en.wikipedia.org/w/index.php?title=Shadow_Copy&oldid=963779091, Jun. 21, 2020, 7 pages.

(Continued)

*Primary Examiner* — Gautam Sain
*Assistant Examiner* — Wei Ma
(74) *Attorney, Agent, or Firm* — Ryan, Mason & Lewis, LLP

(57) ABSTRACT

Techniques disclosed herein provide improved techniques for generating backup copies associated with applications. For example, a method comprises managing synchronous generation of a backup copy of an application comprised of two or more application components respectively executed on two or more host devices, wherein each host device has a storage system associated therewith, by controlling the creation of a backup copy of each application component executed on each host device on its associated storage system within the same time period.

20 Claims, 5 Drawing Sheets

(56) References Cited

U.S. PATENT DOCUMENTS

2020/0034245 A1* 1/2020 Kohler .............. G06F 11/1458
2020/0351345 A1* 11/2020 Bansod .................. H04L 67/51

OTHER PUBLICATIONS

Microsoft Docs, "Volume Shadow Copy Service," https://docs.microsoft.com/en-us/windows-server/storage/file-server/volume-shadow-copy-service#how-volume-shadow-copy-service-works, Jan. 30, 2019, 23 pages.

Microsoft, "Volume Shadow Copy Service," Accessed Oct. 16, 2020, 351 pages.

\* cited by examiner

SYNCHRONIZED GENERATION OF BACKUP COPY FOR FEDERATED APPLICATION IN AN INFORMATION PROCESSING SYSTEM

FIELD

The field relates generally to information processing systems, and more particularly to techniques for generating backup copies for federated applications independent of underlying storage systems.

BACKGROUND

Protecting a federated application program (federated application) in a consistent manner is quite a challenging task for application administrators as it requires copying/backing up components of the application which are hosted across multiple operating systems and of different types (e.g., databases, filesystems, etc.). Existing technologies such as the Volume Shadow Copy Service or VSS from Microsoft® are intended to assist in creating a consistent copy of an application. However, the consistency offered by VSS is limited to a single server/operating system (OS).

Typically, administrators of such applications rely on underlying storage infrastructure crash consistency technology (also called consistency groups) to create a consistent image, rely on cold backups (which involves application downtime), or take independent backups of each component separately. Depending on storage infrastructure, consistency typically means that all components of an application should be using the same storage system for storing their data files. This poses administrative challenges as well as inefficient usage of storage resources and not many storage systems support consistency groups.

SUMMARY

Illustrative embodiments provide improved techniques for generating backup copies associated with federated applications.

For example, in an illustrative embodiment, a method comprises managing synchronous generation of a backup copy of an application comprised of two or more application components respectively executed on two or more host devices, wherein each host device has a storage system associated therewith, by controlling the creation of a backup copy of each application component executed on each host device on its associated storage system within the same time period.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide for generating a consistent online backup copy for a federated application independent of the underlying storage system consistency.

These and other features and advantages of embodiments described herein will become more apparent from the accompanying drawings and the following detailed description.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
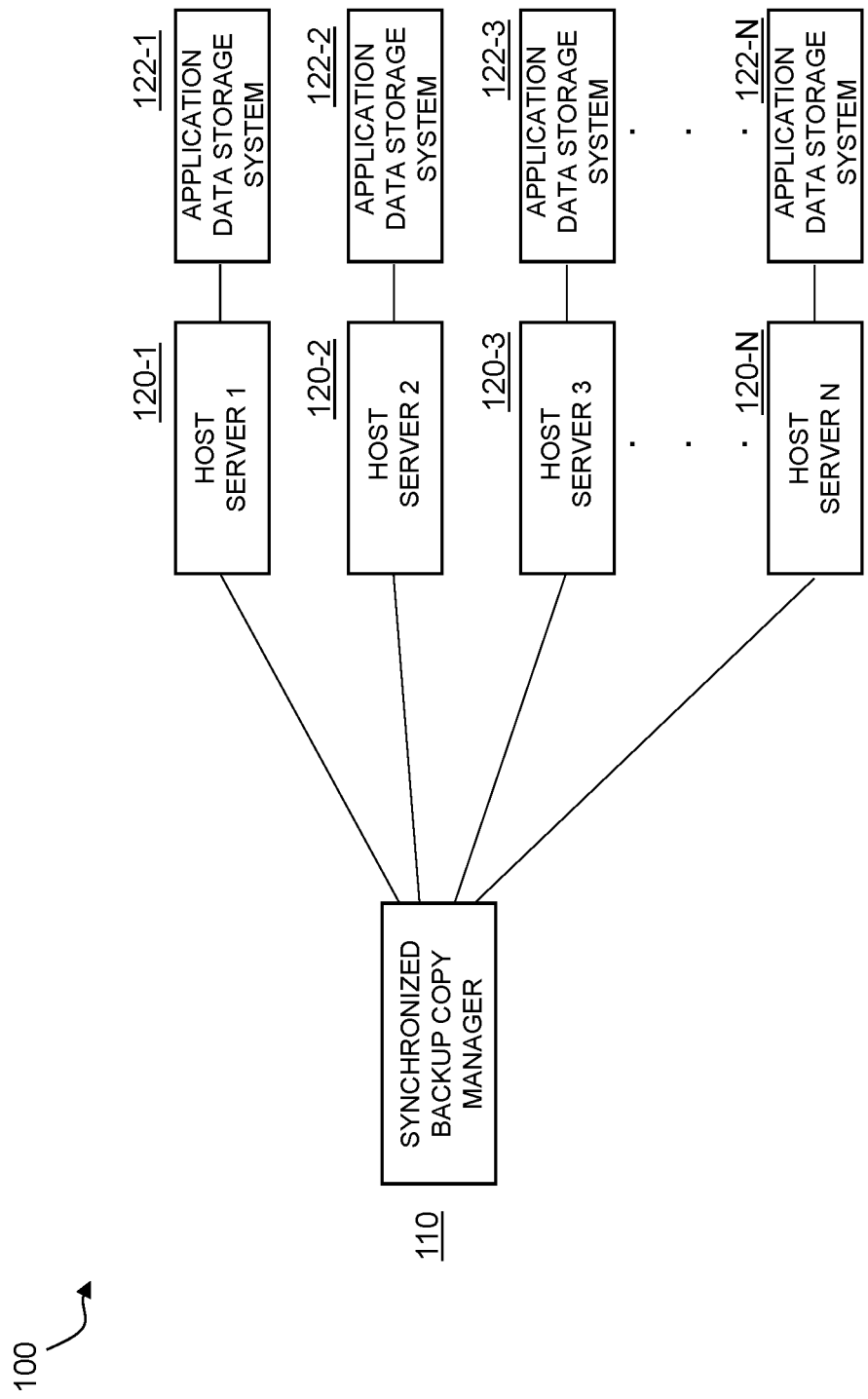
FIG. 1 illustrates an information processing system with synchronized backup copy management according to an illustrative embodiment.

FIG. 1 illustrates an information processing system 100 with synchronized backup copy management according an illustrative embodiment. As shown, information processing system 100 comprises a synchronized backup copy manager 110 operatively coupled to a set of host servers 120-1, 120-2, 120-3, . . . , 120-N (collectively referred to as host servers 120 or individually as host server 120). A host server is an example of what may be referred to herein, more generally, as a "host" or a "host device." As will be explained in further detail herein, synchronized backup copy manager 110 is configured to manage generation of a backup copy of a federated application having components executing on the host servers 120. It is to be understood that each host server 120 executes one or more application components of a federated application and has its own application data storage associated therewith. A subset of the host servers 120 may have a different operating system (OS) from one or more other subsets of the host servers 120. Further, one or more of the host servers 120 may be part of a different cloud platform than one or more of the other host servers 120. Application data storage for the host servers is depicted in FIG. 1 as a set of application data storage systems 122-1, 122-2, 122-3, . . . , 122-N (collectively referred to as application data storage systems 122 or individually as application data storage system 122). While each host server 120 is shown as having its own application data storage system 122, in alternative embodiments, two or more of the host servers 120 may have respective application data storage areas in the same application data storage system 122.

In illustrative embodiments, the application data storage systems 122 can be configured in a logical storage unit (LUN) based storage configuration where the host servers 120 execute application components of a federated application and application data volumes (including data and/or metadata) generated in accordance with the execution of the application components are stored on the application data storage systems 122 in the form of LUNs. In some embodiments, each application data storage system 122 contains LUN storage resources that provide host servers 120 with access to general purpose block-level storage through network-based Internet Small Computer Systems Interface (iSCSI) and/or Fibre Channel (FC) protocols. With LUN storage, addressable partitions of block storage resources can be managed so that host servers 120 can use the LUN resources over FC or Internet Protocol (IP) connections. More particularly, after a host server 120 connects to a LUN, it can use the LUN similar to a local storage drive. In further embodiments, an application data storage system 122 may comprise a storage array with a set of storage drives implemented in a Redundant Array of Independent Disks (RAID) based configuration.

It is to be understood that, in illustrative embodiments, each LUN is a block of storage that can stand alone or otherwise be associated with a consistency group. A consistency group is an addressable instance of LUN storage that can contain one or more LUNs and is associated with one or more attached host servers 120. Consistency groups help organize the storage allocated for a particular host server or host servers. Snapshots or other copies taken of a consistency group apply to all LUNs associated with the group.

As will be further explained below, illustrative embodiments provide functionalities for generating a backup copy for a federated application in an information processing system by enabling a backup copy manager to synchronize backup operations across multiple host servers. In the context of information processing system 100, synchronized backup copy manager 110 is configured to synchronize backup operations across host servers 120. In some embodiments, the backup copy framework that is adapted is the Volume Shadow Copy Service (VSS) framework as mentioned above. However, alternative embodiments are not limited to a VSS framework.

Note that while synchronized backup copy manager 110 is shown in FIG. 1 as functionally separate from host servers 120 (e.g., in some embodiments, implemented on a dedicated server operatively coupled to the host servers 120 and/or the application data storage systems 122), it is to be appreciated that synchronized backup copy manager 110 can be implemented in part or in whole on one or more of the host servers 120 and/or in a storage controller (not expressly shown) of one or more of application data storage systems 122. Further implementations are contemplated in alternative embodiments.

Further, while in some embodiments each host server 120 executes a component or part of a single federated application, in other embodiments, each host server 120 may execute a containerized instance of the entire federated application. Thus, embodiments advantageously manage the synchronous generation of a backup copy associated with a federated application. Still further, the term application as used herein can include scenarios where the application is a set of multiple application programs. As such, embodiments may also manage the backup of a federated application wherein multiple different applications that make up the federated application individually execute on the host servers 120. Accordingly, as illustratively used herein, two components of a federated application can be two different functional parts of a federated application, two instances of the same functional parts of a federated application, two different applications that make up the federated application, two instances of the same application of a federated application that is made up of different applications, some combination of the above, as well as other implementations based on other definitions of a federated application.

In a VSS-based embodiment, as will be illustratively explained herein, synchronized backup copy manager 110 synchronizes callbacks across the multiple host servers 120, some of which are assumed to have different operating systems (OS) from others, in order to generate a backup copy associated with a federated application executing across the multiple host servers 120. A set of orchestration steps is used to prepare applications for back-up along with controls with a VSS framework to synchronize VSS commit windows across different OSs executed by the host servers 120. The execution of the set of orchestration steps advantageously results in all components of the federated application residing on the OS-diverse host servers 120 executing the backup copy operation at the same time (or contemporaneously similar times) when inputs/outputs (IOs) are frozen by a windows kernel across all the involved OS instances.

In a VSS shadow copy operation, the operation occurs between freeze and thaw events. The freeze event serves to ensure that all write operations (by a host server 120) to the disk (application data storage system 122) are temporarily stopped and that files are in a well-defined state for backup. The thaw event serves to resume writes to the disk and clean up any temporary files or other temporary state information that were created in association with the shadow copy. The default window between the freeze and thaw events is relatively small (typically 60 seconds) so as to minimize interruption of any write operations.

Figure 2A:
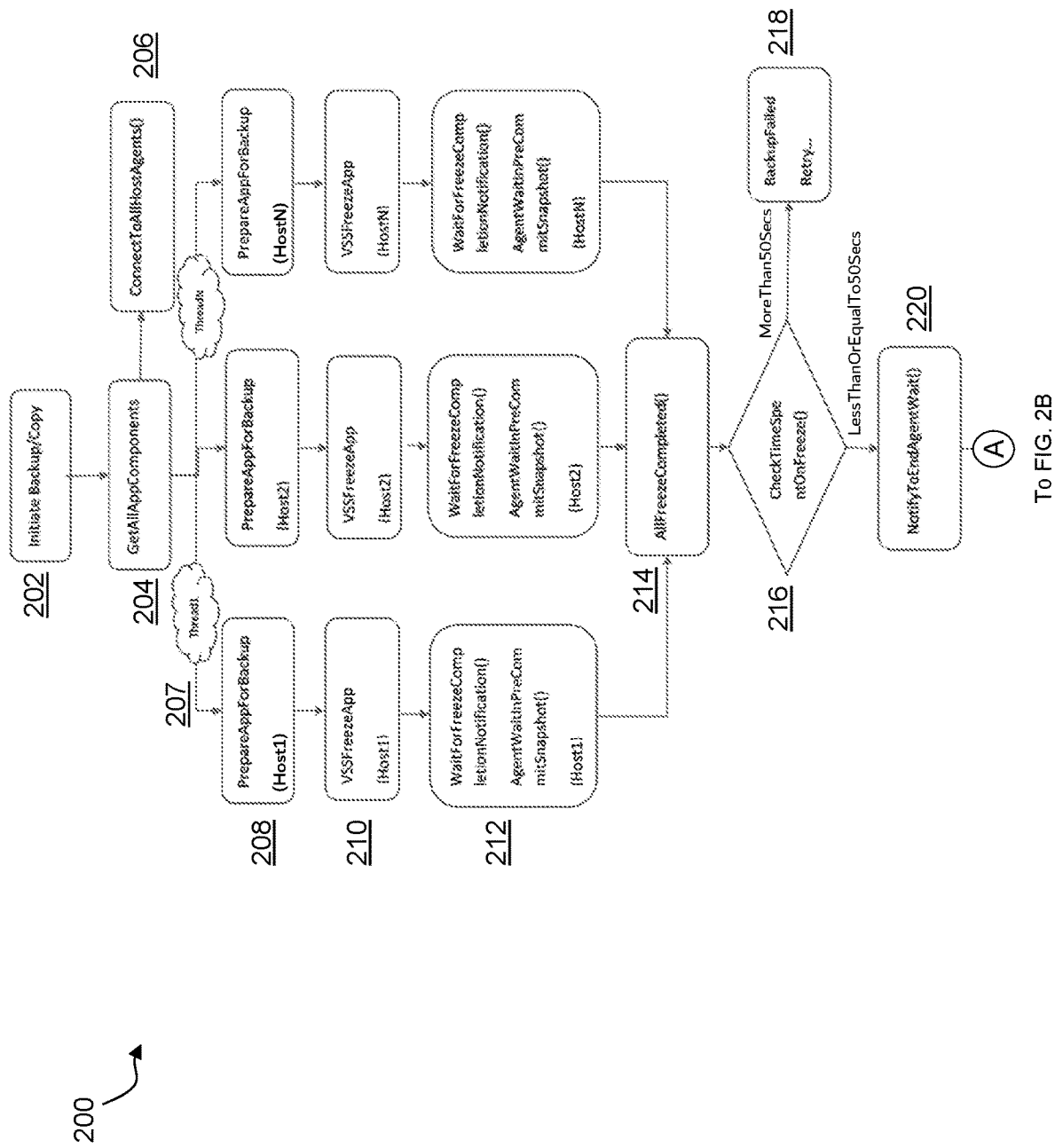
FIGS. 2A and 2B illustrate an example workflow for a synchronized backup copy manager for generating a backup copy of a federated application distributed across multiple host servers according to an illustrative embodiment.
Figure 2B:
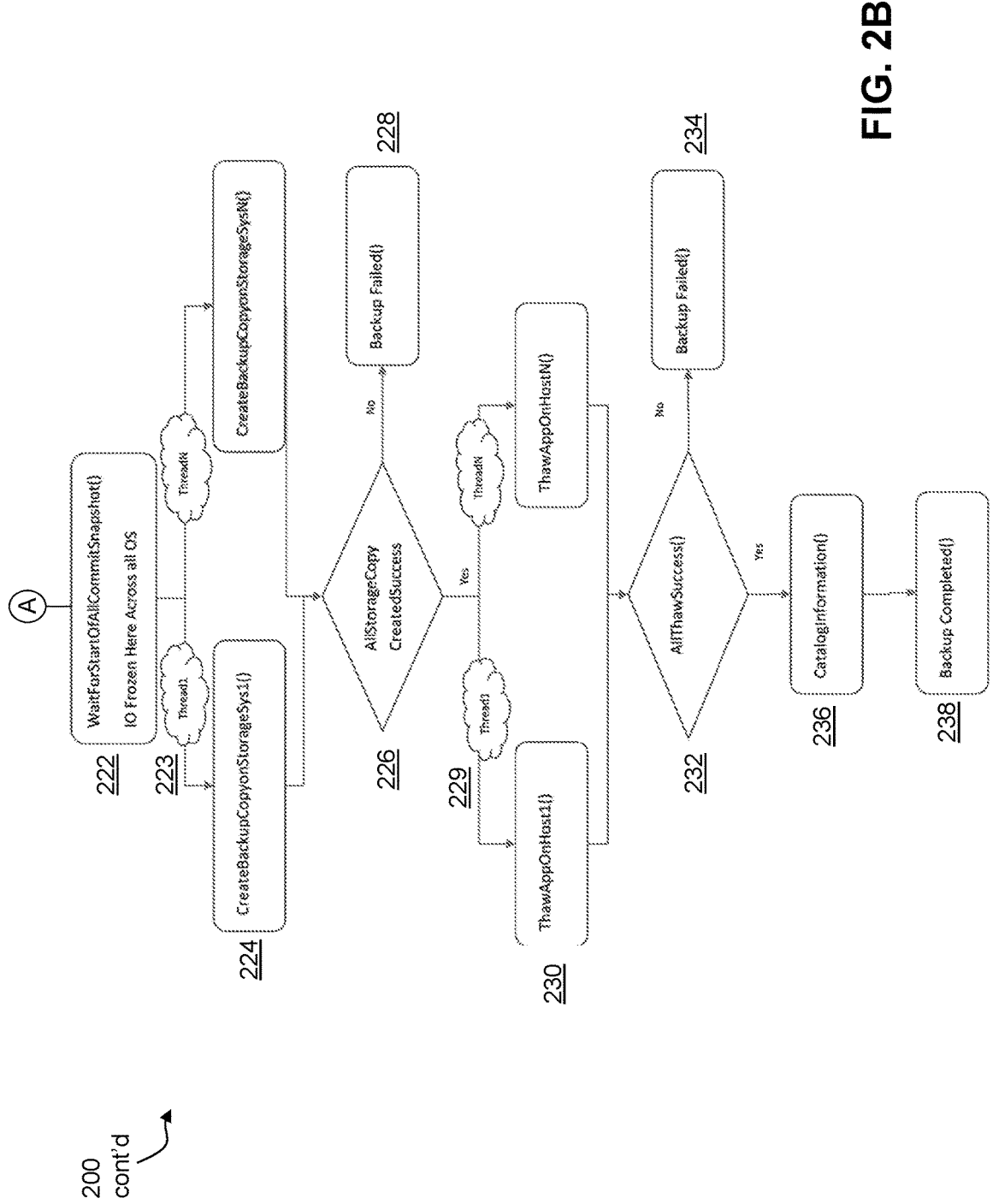

FIGS. 2A and 2B illustrate an example workflow 200 (i.e., backup copy process) from the perspective of the synchronized backup copy manager (e.g., 110) for generating a backup copy of a federated application distributed across multiple host servers (e.g., 120) according to an illustrative embodiment. More particularly, the steps of workflow 200 are performed by or otherwise caused or initiated by synchronized backup copy manager 110 while reference to Host1, Host2, . . . , HostN in workflow 200 corresponds to host servers 120-1, 120-2, 120-3, . . . , 120-N, and StoragSys1( ), . . . , StorageSysN( ) corresponds to application data storage systems 122-1, 122-2, 122-3, . . . , 122-N. It is to be appreciated that the text in each block of workflow 200 represents one or more programmatic events, commands and/or instructions executed by or otherwise issued by synchronized backup copy manager 110 based on a VSS-based methodology to effectuate the steps. By "VSS-based" as illustratively used here, it is meant that the VSS protocol is adapted for backup copy generation synchronization across multiple host servers in accordance with illustrative embodiments.

In step 202, synchronized backup copy manager 110 initiates the VSS-based backup copy process.

In step 204, synchronized backup copy manager 110 identifies all the application components of the federated application that are part of the backup copy process (GetAllAppComponents).

In step 206, once the application components have been identified, synchronized backup copy manager 110 identifies and connects to the corresponding host servers 120 on which the identified application components execute (ConnectToAllHostAgents( )). Note that the term "agent" as will be further explained herein refers to a module resident on each host server 120 that is used by the synchronized backup copy manager 110 to synchronously control the backup copy process across the multiple host servers 120.

In step 207, synchronized backup copy manager 110 instantiates a set of execution threads, one thread for each host server 120 (1, . . . , N) for the backup copy process. The step 207 thread for each host server 120 corresponds to a VSS-based freeze event.

In the illustrative embodiment of workflow 200, each thread instantiated in step 207 is configured to:

notify the application component executing on the corresponding host server that the backup copy process is being initiated (step 208—PrepareAppForBackup);

cause the host server 120 to freeze the application component from performing write operations as explained above (step 210, VSSFreezeApp); and wait for a freeze completion notification from the host server 120 indicating the host server 120 is waiting in a pre-commit snapshot state (step 212, WaitForFreezeCompletionNotification( ) and AgentWaitinPreCommitSnapshot( )). In this illustrative embodiment, a snapshot is the backup copy for the application component of each host server 120.

In step 214, synchronized backup copy manager 110 determines that steps in the freeze event threads (steps 208, 210 and 212) for all host servers 120 have completed (AllFreezeCompleted( )).

In step 216, synchronized backup copy manager 110 determines the time spent on the execution of the steps in the freeze event thread (CheckTimeSpentOnFreeze( )). Recall that the default window between the freeze and thaw events is typically 60 seconds.

If the time spent on the execution of the steps in the freeze event threads is more than 50 seconds (MoreThan50Secs), then the synchronized backup copy manager 110 declares that the backup copy process failed (BackupFailed) and initiates a retry (Retry) of the freeze event threads in step 218.

If the time spent on the execution of threads 207 is less than or equal to 50 seconds (LessThanOrEqualTo50Secs), then the synchronized backup copy manager 110 notifies the agents in host servers 120 to end the corresponding agent wait in step 220 (NotifyToEndAgentWait( )). This gives the host servers at least 10 seconds (depending on how long the freeze event took) to perform backup generation and commit their snapshots.

In step 222, synchronized backup copy manager 110 causes all IO operations to be frozen across all host servers 120 and waits for the start of the commit snapshot operation across all host servers 120 (WaitForStartOfAllCommitSnapshot( )).

In step 223, synchronized backup copy manager 110 instantiates a set of execution threads, one thread for each host server 120 to create a backup copy on its corresponding application data storage system 122.

In step 224, the backup copy for the application component in each host server 120 is created (CreateBackupCopyOnStorageSys( )). This may be considered the commit window (i.e., more generally, time period) within which all the individual backup copies of the application components are synchronously generated.

In step 226, synchronized backup copy manager 110 determines if it received notification from each thread that the backup copy has been successfully created and stored (All StorageCopyCreatedSuccess).

If no in decision step 226, then workflow 200 issues a backup failed message in step 228 (Backup Failed( ).

If yes in decision step 226, then synchronized backup copy manager 110 instantiates a set of execution threads, one execution thread for each host server 120 to end the backup copy process in step 229. The step 229 thread for each host server 120 corresponds to a VSS-based thaw event. More particularly, step 230 releases the freeze (thaws) on the application component to resume write operations and any other IO operations that were temporarily halted (ThawAppOnHost( )).

In step 232, synchronized backup copy manager 110 determines if it received notification from each thread that the host server 120 has resumed normal operations (AllThawSuccess( )).

If no in decision step 232, then workflow 200 issues a backup failed message in step 234 Backup Failed( )).

If yes in decision step 232, then synchronized backup copy manager 110 catalogs the success of the backup copy process (CatalogInformation( )) in step 236 and then ends the backup copy process (BackupCompleted( )) in step 238.

Advantageously, the concurrent threads instantiated by the backup copy manager 110 for the host servers 120 for the freeze event, the backup copy creation, and the thaw event enable a backup copy of the entire federated application to be synchronously created across the multiple host servers 120. Since the host servers 120 can be OS-diverse, the backup copy of the federated application is created independent of the underlying storage system type.

Figure 3:
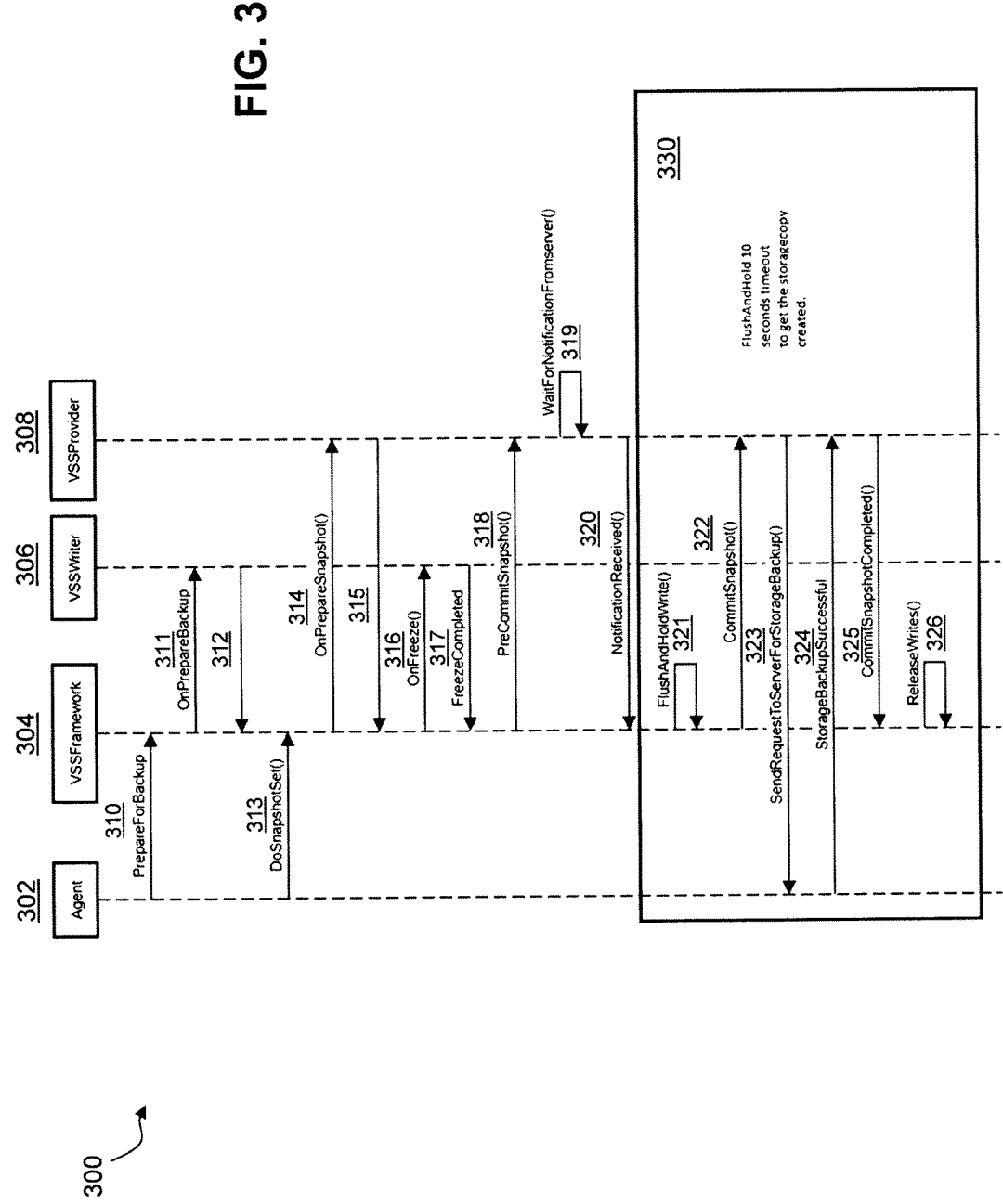
FIG. 3 illustrates an example workflow for a host server participating in synchronous generation of a backup copy of a federated application distributed across multiple host servers according to an illustrative embodiment.

FIG. 3 illustrates an example workflow 300 (i.e., backup copy process) from the perspective of each host server for generating a backup of a federated application distributed across multiple host servers 120 according to an illustrative embodiment.

As shown for workflow 300, each host server 120 is assumed to comprise an agent module (Agent) 302, a framework (VSSFramework) 304, a writer (VSSWriter) 306, and a provider (VSSProvider) 308. It is to be appreciated that agent module 302 is in communication with synchronized backup copy manager 110 as mentioned above. In terms of the VSS protocol, the agent module 302 may be considered a requestor (VSSRequestor). However, in alternative embodiments, other entities can serve as a requestor. It is to be appreciated that the labels in each step of workflow 300 represent one or more programmatic events, commands and/or instructions executed or otherwise issued within each host server 120 based on a VSS-based methodology to effectuate the steps.

The VSS protocol coordinates snapshot copy-based backups and restore operations and includes functional components such as those depicted in FIG. 3. A requestor initiates backup and restore operations, and may also specify snapshot attributes for the backups that it initiates. A writer owns and manages the data to be captured in the snapshot. A provider creates and manages the snapshot, and can be either a hardware provider or a software provider.

In step 310, agent module 302 instructs framework 304 to prepare for the backup (PrepareForBackup).

In step 311, framework 304 then instructs writer 306 to prepare for the backup (OnPrepareBackup).

In step 312, writer 306 confirms to framework 304 receipt of the instruction.

In step 313, agent module 302 instructs framework 304 to initiate performance of the backup (DoSnapshotSet( )).

In step 314, framework 304 instructs provider 308 to prepare for the backup (OnPrepareSnapshot).

In step 315, provider 308 confirms to framework 304 receipt of the instruction.

In step 316, framework 304 initiates the freeze event (as explained above in the context of workflow 200) via writer 306 (OnFreeze( )). Recall that the freeze event serves to ensure that all write operations (by a host server 120) to the disk (application data storage system 122) are temporarily stopped and that files are in a well-defined state for backup.

In step 317, writer 306 indicates to framework 304 that the freeze event is completed (FreezeCompleted).

In step 318, framework 304 initiates the pre-commit snapshot state (as explained above in the context of workflow 200) via provider 308 (PreCommitSnapshot( )).

In step 319, provider 308 waits for notification from the application data storage system 122 (WaitForNotificationFromServer( )).

In step 320, notification is sent from provider 308 to framework 304 (NotificationReceived( )).

Steps 321 through 326 are part of a flush and hold operation 330 (FlushAndHold) which corresponds to a timeout for the above-mentioned 10-second interval (i.e., also referred to herein as a commit window or, more generally, as a time period) to enable the backup copy to be created on the application data storage system 122.

Thus, in step 321, framework 304 initiates the flush and hold operation (FlushAndHoldWrite( )).

In step 322, framework 304 instructs provider 308 to create and commit the snapshot (CommitSnapshot( )).

In step 323, provider 308 sends a request to the application data storage system 122 through agent module 302 to store the snapshot (SendRequestToServerForStorageBackup( )).

In step 324, the application data storage system 122 acknowledges to provider 308 through agent module 302 that the snapshot storage was successful (StorageBackupSuccessful).

In step 325, provider 308 notifies framework 304 that the snapshot has been committed and thus the backup copy process is completed (CommitSnapshotCompleted( )).

In step 326, framework 304 releases the hold on operations (ReleaseWrites( )) and normal application component execution operations resume.

Advantageously, as explained herein, illustrative embodiments generate a backup copy for a federated application in an information processing system by enabling a synchronized backup copy manager to synchronize backup operations across multiple host servers. A set of orchestration steps is used to prepare applications for back-up along with controls with a framework to synchronize commit windows across the host servers. This advantageously results in components of the federated application residing on the host servers executing the backup copy operation at the same time. Furthermore, illustrative embodiments provide for generating a consistent online backup copy for a federated application independent of the underlying storage system consistency. An online backup or a hot backup, also known as a dynamic backup, is a backup performed on application data while the application is still accessible to users.

Figure 4:
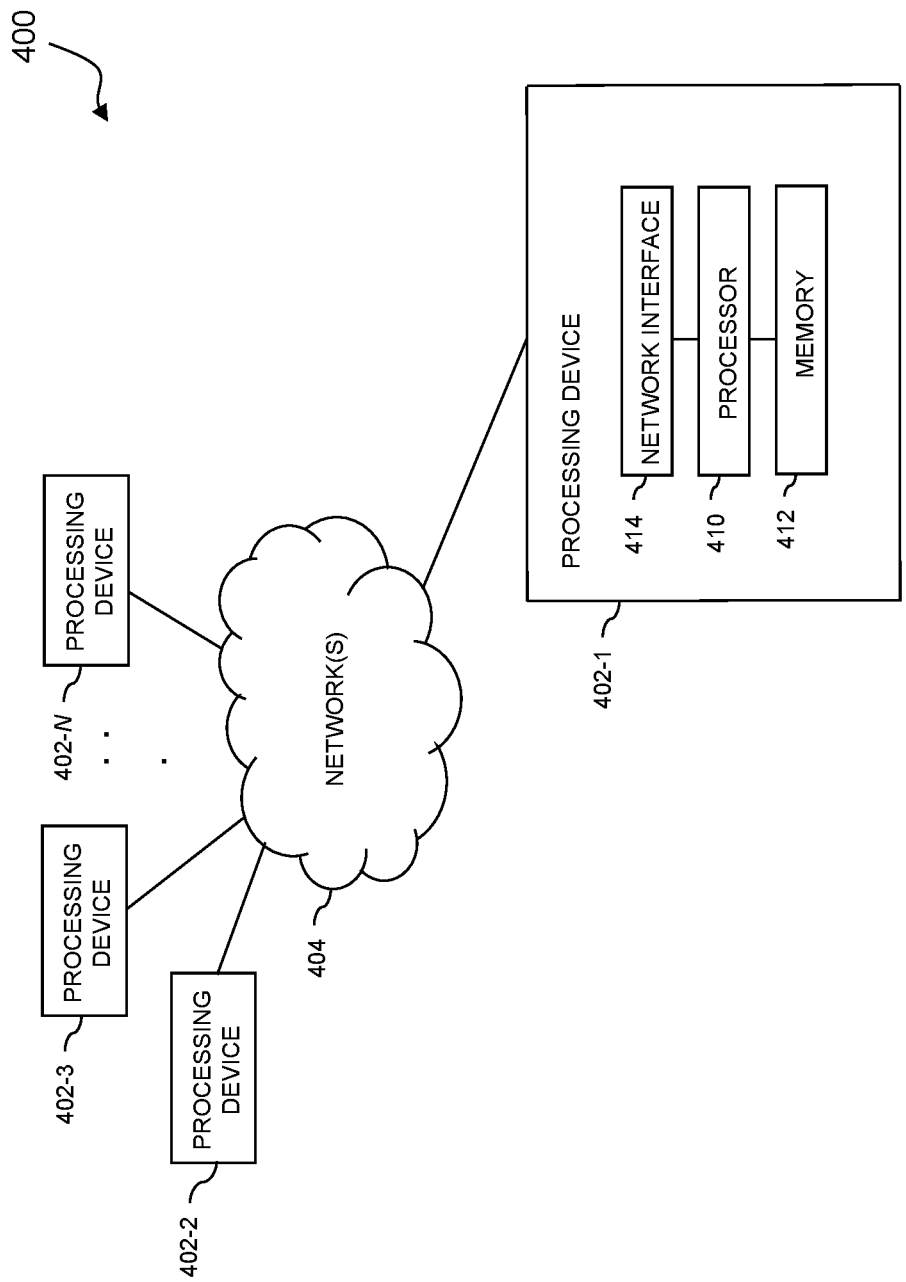
FIG. 4 illustrates a processing platform used to implement an information processing system with synchronized backup copy generation functionalities for federated applications according to an illustrative embodiment.

FIG. 4 depicts a processing platform 400 used to implement consistent backup management associated with federated applications according to an illustrative embodiment. More particularly, processing platform 400 is a processing platform on which a computing environment with functionalities described herein (e.g., FIGS. 1, 2A, 2B and 3 and otherwise described herein) can be implemented.

The processing platform 400 in this embodiment comprises a plurality of processing devices, denoted 402-1, 402-2, 402-3, . . . 402-N, which communicate with one another over network(s) 404. It is to be appreciated that the methodologies described herein may be executed in one such processing device 402, or executed in a distributed manner across two or more such processing devices 402. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 402 shown in FIG. 4. The network(s) 404 represent one or more communications networks that enable components to communicate and to transfer data therebetween, as well as to perform other functionalities described herein.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random-access memory (RAM), read-only memory (ROM) or other types of memory, in any combination. The one or more software programs when executed by a processing device such as the processing device 402-1 causes the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the networks 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the system shown as 400 in FIG. 4 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-4 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory, the at least one processing device, when executing program code, is configured to:
identify two or more application components of a single application distributed across two or more host devices of a plurality of host devices; and
manage synchronous generation of a backup copy of each of the two or more application components of the single application respectively executed on the two or more host devices, wherein each host device has a storage system associated therewith, wherein managing synchronous generation of the backup copy of the single application comprises controlling the creation of a backup copy of each application component executed on each host device on its associated storage system within a same time period;
wherein managing the synchronous generation of the backup copy of each of the two or more application components comprises:
instantiating a first set of concurrent execution threads on the two or more host devices to halt write operations associated with the two or more application components;
determining whether an amount of time taken to complete the first set of concurrent execution threads exceeds a designated threshold amount of time;
responsive to determining that the amount of time taken to complete the first set of concurrent execution threads does not exceed the designated threshold amount of time, instantiating a second set of concurrent execution threads on the two or more host devices to create the backup copy of each of the two or more application components; and
responsive to determining that each of the two or more host devices has successfully completed creation and storage of the backup copy for each of its associated ones of the two or more application components, instantiating a third set of concurrent execution threads on the two or more host devices to release the halt on the write operations associated with the two or more application components;
wherein a first subset of the two or more host devices run a first operating system and at least a second subset of the two or more host devices run a second operating system, the second operating system being different than the first operating system; and
wherein the first, second and third sets of concurrent execution threads provide a synchronized commit window across the first subset of the two or more host devices running the first operating system and the second subset of the two or more host devices running the second operating system.

2. The apparatus of claim 1, wherein the same time period within which the creation of the backup copy of each application component occurs is the synchronized commit window; and wherein the at least one processing device is further configured to initiate generation of a failure message in the event the synchronized commit window is exceeded by at least one of the two or more host devices.

3. The apparatus of claim 1, wherein managing synchronous generation of the backup copy of the single application further comprises implementing an adapted volume shadow copy service protocol.

4. The apparatus of claim 1, wherein managing synchronous generation of the backup copy of the single application is performed by a synchronous backup manager operatively coupled to respective agent modules in the host devices.

5. The apparatus of claim 1, wherein the application components collectively comprise a single federated application.

6. The apparatus of claim 1, wherein at least a first one of the two or more host devices is part of a first cloud platform and at least a second one of the two or more host devices is part of a second cloud platform different than the first cloud platform.

7. The apparatus of claim 1, wherein the first, second and third sets of concurrent execution threads utilize synchronized callbacks across the two or more host devices.

8. A method comprising:
identifying two or more application components of a single application distributed across two or more host devices of a plurality of host devices; and
managing synchronous generation of a backup copy of each of the two or more application components of the single application respectively executed on the two or more host devices, wherein each host device has a storage system associated therewith, wherein managing synchronous generation of the backup copy of the single application comprises controlling the creation of a backup copy of each application component executed on each host device on its associated storage system within a same time period;
wherein managing the synchronous generation of the backup copy of each of the two or more application components comprises:
instantiating a first set of concurrent execution threads on the two or more host devices to halt write operations associated with the two or more application components;
determining whether an amount of time taken to complete the first set of concurrent execution threads exceeds a designated threshold amount of time;
responsive to determining that the amount of time taken to complete the first set of concurrent execution threads does not exceed the designated threshold amount of time, instantiating a second set of concurrent execution threads on the two or more host devices to create the backup copy of each of the two or more application components; and
responsive to determining that each of the two or more host devices has successfully completed creation and storage of the backup copy for each of its associated ones of the two or more application components, instantiating a third set of concurrent execution threads on the two or more host devices to release the halt on the write operations associated with the two or more application components;
wherein a first subset of the two or more host devices run a first operating system and at least a second subset of the two or more host devices run a second operating system, the second operating system being different than the first operating system; and wherein the first, second and third sets of concurrent execution threads provide a synchronized commit window across the first subset of the two or more host devices running the first operating system and the second subset of the two or more host devices running the second operating system; and
wherein the method is performed by at least one processing device comprising a processor coupled to a memory executing program code.

9. The method of claim 8, wherein the same time period within which the creation of the backup copy of each application component occurs is the synchronized commit window; and
further including initiating generation of a failure message in the event the synchronized commit window is exceeded by at least one of the two or more host devices.

10. The method of claim 8, wherein managing synchronous generation of the backup copy of the single application further comprises implementing an adapted volume shadow copy service protocol.

11. The method of claim 8, wherein managing synchronous generation of the backup copy of the single application is performed by a synchronous backup manager operatively coupled to respective agent modules in the host devices.

12. The method of claim 8, wherein the application components collectively comprise a single federated application.

13. The method of claim 8, wherein at least a first one of the two or more host devices is part of a first cloud platform and at least a second one of the two or more host devices is part of a second cloud platform different than the first cloud platform.

14. A computer program product comprising a non-transitory processor-readable storage medium having stored therein program code of one or more software programs, wherein the program code when executed by at least one processing device causes the at least one processing device to:
identify two or more application components of a single application distributed across two or more host devices of a plurality of host devices; and
manage synchronous generation of a backup copy of each of the two or more application components of the single application respectively executed on the two or more host devices, wherein each host device has a storage system associated therewith, wherein managing synchronous generation of the backup copy of the single application comprises controlling the creation of a backup copy of each application component executed on each host device on its associated storage system within a same time period;
wherein managing the synchronous generation of the backup copy of each of the two or more application components comprises:
instantiating a first set of concurrent execution threads on the two or more host devices to halt write operations associated with the two or more application components;
determining whether an amount of time taken to complete the first set of concurrent execution threads exceeds a designated threshold amount of time;
responsive to determining that the amount of time taken to complete the first set of concurrent execution threads does not exceed the designated threshold amount of time, instantiating a second set of concurrent execution threads on the two or more host devices to create the backup copy of each of the two or more application components; and responsive to determining that each of the two or more host devices has successfully completed creation and storage of the backup copy for each of its associated ones of the two or more application components, instantiating a third set of concurrent execution threads on the two or more host devices to release the halt on the write operations associated with the two or more application components;

wherein a first subset of the two or more host devices run a first operating system and at least a second subset of the two or more host devices run a second operating system, the second operating system being different than the first operating system; and wherein the first, second and third sets of concurrent execution threads provide a synchronized commit window across the first subset of the two or more host devices running the first operating system and the second subset of the two or more host devices running the second operating system.

15. The computer program product of claim 14, wherein the same time period within which the creation of the backup copy of each application component occurs is the synchronized commit window; and the program code when executed further causes the at least one processing device to initiate generation of a failure message in the event the synchronized commit window is exceeded by at least one of the two or more host devices.

16. The computer program product of claim 14, wherein managing synchronous generation of the backup copy of the single application further comprises implementing an adapted volume shadow copy service protocol.

17. The computer program product of claim 14, wherein managing synchronous generation of the backup copy of the single application is performed by a synchronous backup manager operatively coupled to respective agent modules in the host devices.

18. The computer program product of claim 14, wherein the application components collectively comprise a single federated application.

19. The computer program product of claim 14, wherein at least a first one of the two or more host devices is part of a first cloud platform and at least a second one of the two or more host devices is part of a second cloud platform different than the first cloud platform.

20. The computer program product of claim 14, wherein the first, second and third sets of concurrent execution threads utilize synchronized callbacks across the two or more host devices.

* * * * *